No. 618,366. Patented Jan. 24, 1899.
G. E. SAVAGE & M. SEIPS.
HANDLE FOR TEA OR COFFEE POTS.
(Application filed Oct. 3, 1898.)
(No Model.)
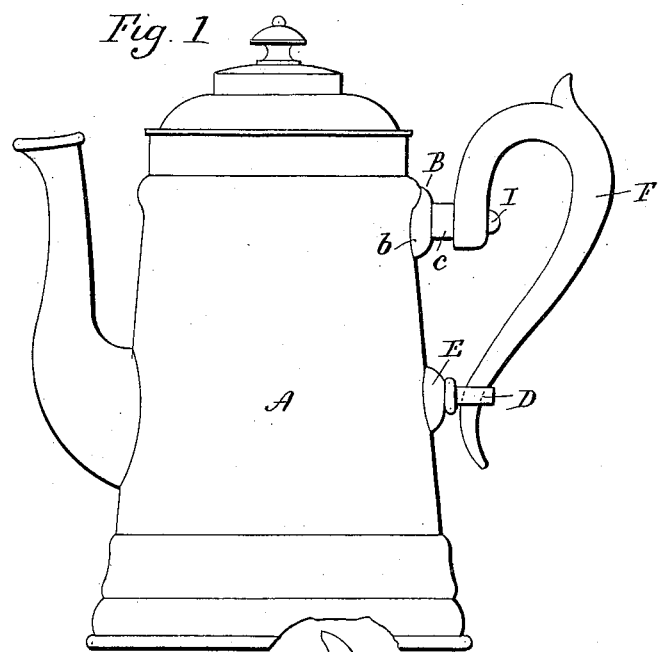
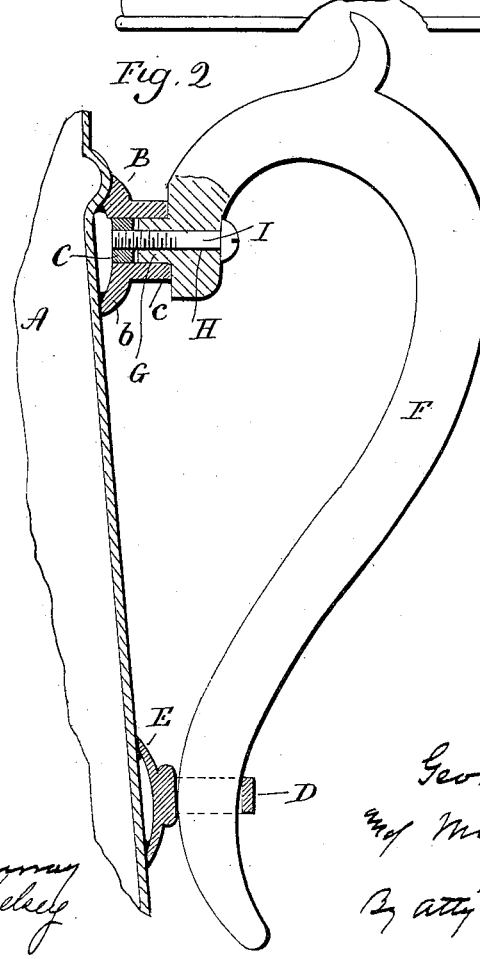
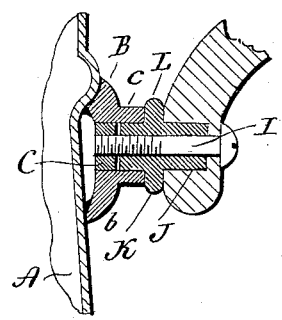
George E. Savage
Michael Seips.
Inventors
By atty Earle Seymour
Witnesses
J. H. Shumway
Lillian D. Kelsey

UNITED STATES PATENT OFFICE.

GEORGE E. SAVAGE AND MICHAEL SEIPS, OF MERIDEN, CONNECTICUT, ASSIGNORS TO THE MANNING BOWMAN & COMPANY, OF SAME PLACE.

HANDLE FOR TEA OR COFFEE POTS.

SPECIFICATION forming part of Letters Patent No. 618,366, dated January 24, 1899.

Application filed October 3, 1898. Serial No. 692,515. (No model.)

*To all whom it may concern:*

Be it known that we, GEORGE E. SAVAGE and MICHAEL SEIPS, of Meriden, in the county of New Haven and State of Connecticut, have invented a new Improvement in Handles for Tea or Coffee Pots; and we do hereby declare the following, when taken in connection with the accompanying drawings and the letters of reference marked thereon, to be a full, clear, and exact description of the same, and which said drawings constitute part of this specification, and represent, in—

Figure 1, a side view of a coffee-pot having a handle applied thereto in accordance with our invention; Fig. 2, a side view, partially in section, illustrating the formation of the socket and the manner of connecting the handle thereto; Fig. 3, a broken sectional view illustrating the connection of a metal handle with our improved socket.

This invention relates to an improvement in handles for "tea and coffee pots," and by this term we wish to be understood as including pots of this character for whatever purpose they may be employed.

In the usual construction of metal tea and coffee pots the handles soon become so heated from the contents of the pot as to become unbearable to the hand. To overcome this, wooden handles have been employed; but difficulty is experienced in properly securing such wooden handles to the pot.

The object of this invention is a simple arrangement for securing handles to tea or coffee pots and whether such handles be formed from wood or metal. A common method of securing handles is by forming the handle with sockets or ears integral with or firmly secured to and practically a part of the handle, and these sockets are soldered to the pot; but with the handle thus applied difficulty is experienced in properly finishing the pot, and in case of accident to the handle the pot is practically destroyed.

A further object of this invention is to so construct the parts of the handle that the socket may be attached to the pot at any stage in its construction and the handle secured to the socket after the pot is practically complete; and the invention consists in details of construction and combinations of parts, as will be hereinafter described, and particularly recited in the claims.

The pot A is formed from metal of the desired form and in any approved method of manufacture. To the rear of this pot, near the upper end, is secured a socket B by solder or otherwise, and this socket is of cast metal and comprises a flange *b*, by which it is secured to the pot, and a neck *c*. At the inner end of the neck is located a nut C, which is preferably independently formed and the socket cast around it. A similar socket may be fixed to the pot in line with but below the upper socket; but preferably we employ a ring or eye D, formed with a plate E, which may be readily secured to the surface of the pot by soldering or otherwise.

If a wooden handle F is employed, as indicated in Figs. 1 and 2, it will be formed at its upper end with a lug or projection G, adapted to pass into the neck *c* of the upper socket, and through the handle and projection is a longitudinal hole H for the reception of a screw-bolt I, the inner end of which engages with the nut C and so that the handle is clamped to the socket. The head of the bolt may be set flush with the surface of the handle or may be suitably ornamented or knurled, whereby it may be readily removed and at the same time add to the ornamentation of the handle or at least not detract from the appearance thereof. If the lower socket is formed in the same way, the connection between the handle and the socket will be similarly formed, but if formed as above described the lower end of the handle will be suitably curved, so as to pass through the eye D before the upper end is engaged with the socket B and so that when the upper end is engaged the handle will be rigidly held in position. It will be seen that the sockets or the socket and eye may be readily secured to the pot at any stage of its construction and the surface of the socket readily finished, and then the handle may be applied without danger of disfiguring any of the parts, and in case the handle becomes broken or otherwise injured it may be readily removed and another inserted in its place.

If a metal handle is employed, we use the same form of sockets; but instead of forming the upper end of the handle with a stud or projection we form it with a recess J, as shown in Fig. 3, and between the handle and the socket insert an insulator K, consisting of a tubular member adapted at one end to enter the neck c of the socket and at the opposite end enter the recess J of the handle, and around this tube we form a flange L, which stands between the outer end of the socket and the surface of the handle, so as to fully insulate one from the other. As in the previous construction, the handle is held in position by a bolt I passing through the tubular member and into engagement with the nut C. With a metal handle the eye D may also be employed, as the points of contact between the lower end of the handle and the eye are so slight that but little heat will be communicated through the eye from the pot to the handle. As is the case with a wooden handle, this metallic handle may be as readily removed and replaced, if desired.

In case a wooden handle is employed and the wood shrinks, so as to become loosened at the socket, or if the insulating material used with the metal handle shrinks it will only be necessary to turn the screw to take up for such shrinkage and hold the parts rigidly in connection.

We are aware that handles have been secured to tea and coffee pots by bolts passing through the end of the handle and a socket secured thereto and through the face of the pot. We are also aware that insulating material between the socket and the end of a handle has been employed. We therefore do not wish to be understood as claiming, broadly, such as our invention.

Having fully described our invention, what we claim as new, and desire to secure by Letters Patent, is—

1. The combination with a pot, of a socket secured thereto, comprising an outwardly-extending collar, a nut fixed within said collar, and a handle having a projection extending into said collar and formed with a passage through the handle and projection for the entrance of a bolt into engagement with said nut, substantially as described.

2. The combination with a pot, of a socket secured near the upper edge thereof and comprising an outwardly-extending collar, a nut permanently fixed in said socket at the inner end of the collar, an eye secured to the surface of the pot below the said socket, and a handle adapted at its lower end to extend through said eye, and provided at its upper end with an extension adapted to enter said collar, and a passage through said extension for the entrance of a bolt into engagement with said nut, substantially as described.

In testimony whereof we have signed this specification in the presence of two subscribing witnesses.

GEO. E. SAVAGE.
MICHAEL SEIPS.

Witnesses:
E. J. POOLEY,
GEO. R. DIMOCK.